2,983,648

PROCESS OF MANUFACTURING OVARY CELL PREPARATIONS FOR THERAPEUTIC PURPOSES

Karlheinz Neumann, Koln-Bayental, Germany, assignor to Rhein-Chemie G.m.b.H., Mannheim, Germany No Drawing. Filed Apr. 19, 1956, Ser. No. 579,143

1 Claim. (Cl. 167—74)

This invention relates to organ preparations designed for physiological uses, and in particular to processes of producing such preparations.

It is an important object of the present invention to provide means facilitating production of both animal and vegetable organ preparations in such a manner as to impart to the same high degrees of physiological efficacy.

It is another object of the present invention to provide means contributing to thoroughly efficient and greatly simplified production of therapeutically utilizable organ tissues and like preparations which are reliable in action as well as inexpensive to manufacture and buy.

A further object of the present invention is to provide means leading to advantageous processes of manufacturing therapeutically valuable materials of the aforesaid type so as to ensure that the yield of such materials from a given quantity of source organs is considerably enhanced over the yields heretofore obtained from known processes employed in this field.

As intimated by the foregoing objects of the invention, a widespread use of organ preparations for therapeutic purposes has only lately been brought about, such preparations requiring that the cellular structure thereof be preserved with an extremely high degree of care by means of very low temperature or freezing drying procedures. In effecting this low temperature drying, it is generally necessary to cool the still fresh organ portion desired as soon and as rapidly as possible after its separation from the source organ, and thereafter to sublimate water or moisture from said portion while maintaining it at a temperature which lies at least below the freezing point of water.

In accordance with the invention, it has now been surprisingly discovered that the action or efficacy of such organ preparations can be substantially increased by warming the fresh organ parts directly prior to the freezing or low temperature drying. For particularly advantageous results, the warming temperature may be well above normally encountered physiological temperatures and may be as high as about 90° C.

As a consequence of the increased therapeutic efficiency of the preparations made by the process according to the present invention, the yield or available quantity of such therapeutically valuable, cellular preparations is considerably enhanced, since it is possible for each individual application to select a correspondingly smaller dosage. The increase in the yield thus makes it possible to produce from any given number of source animals or source organs a higher proportion of therapeutically effective materials.

This, as will be readily realized, is a very important consideration in the cost of manufacture of therapeutically utilizable organ preparations, since a considerable part of the work involved consists of the selection and physiological examination of the source animals as well as of the actual isolation or removal of the individual organs from said animals.

The increased efficiency of the preparations produced according to the present invention will become more fully evident from the following description of an exemplary production and testing procedure which, however, is not to be taken as a limitation of the scope of the invention.

I. For the purpose of testing the enhanced efficiency of the preparation, mice which had both ovaries removed and suffered from a lack of estrogen hormone were employed as test objects. Such estrogen lack may be determined from the cell formation of the vaginal epithelium in a microscopic smear preparation. The appearance of what may be called lumps or grains in the smear preparation is, therefore, a measure of the extent of return of the epithelium, and thus of the animal, to a normal condition.

For testing the efficiency of organ preparations pretreated in accordance with the principles of the invention, a control group of ovaryless mice was injected with untreated cells from tissue of ovaries for overcoming the estrogen lack and another group of mice with treated cells from tissues of animal ovaries, and the average number of lumps or grains in the epithelial smears of both groups were compared for a period of one month. The enhanced efficiency of the treated preparation, or alternatively the lesser efficiency of the untreated preparation, is presented in the accompanying table and expressed in percent of the mean epithelial grain or lump number of the control group.

II. For the pretreatment of the cellular organ preparation, the organ cells were removed from a freshly killed test animal under sterile precautionary conditions, were cut into fine pieces by means of a pair of shears or scissors and then (for testing purposes) divided into weighed portions. Some of the portions were dried at low or freezing temperatures without any special pretreatment and then injected into the control animals.

The other portions were placed into sterile and tightly closed small flasks or glasses and heated in the latter to a temperature of about 60° C. for a period of 15 minutes, the flasks to this end being immersed in a water bath maintained at this temperature. Thereafter, the flasks were cooled in a bath of flowing tap water to a temperature of about 10° C., this requiring a period of about 2 minutes.

Directly thereafter, the preparation was frozen through immersion thereof in a bath of carbonic acid and acetone. The drying was carried out at a temperature of 25° C. below zero (−25° C.). The cells were then suspended in Ringer's solution. The injection of the preparation into the test animals was intramuscular.

The results of this procedure are collated in the following table:

| Test arrangement | No. of test animals | Aver. no. of lumps | Decrease relative to control group | Increase relative to control group |
|---|---|---|---|---|
| | | | Percent | Percent |
| Control animals (injected with conventionally dried cells) | 2<br>4 | 10.4<br>7.7 | | |
| Cells dried above freezing point | 3 | 3.8 | 60 | |
| Prior to freezing, cells left 5 hrs. at room temp | 3 | 8.5 | 12 | |
| Prior to freezing, cells left 15 min. in a mixture of glycerin and Ringer's solution, undried | 2 | 13.0 | | 35 |
| Prior to freezing, cells left 15 min. in a mixture of glycerin and Ringer's solution, dried under freezing conditions | 2 | 15.5 | | 49 |
| Prior to freezing, cells warmed for 30 min. to 37° C., dried under freezing conditions | 3 | 23.5 | | about 206 |
| Prior to freezing, cells warmed for 15 min. to 60° C. dried under freezing conditions | 3 | 27.6 | | about 260 |
| Prior to freezing, cells warmed for 10 min. to 80° C., dried under freezing conditions | 8 | 25.1 | | about 240 |

Various changes and modifications may be made without departing from the spirit and scope of the present invention and it is intended that such obvious changes and modifications be embraced by the annexed claim.

Having thus described the invention, what is claimed as new and desired to be secured by Letters Patent, is:

A process of producing therapeutically efficacious preparations of cells from the tissue of an animal ovary; comprising the steps of removing a quantity of said cells from said organ while the latter is maintained in a fresh state and under sterile conditions, subjecting said removed cells to heat at a temperature ranging from 25° C. to 90° C. for a period of time ranging from 10 to 30 minutes and thereafter rapidly cooling said removed cells while drying said cells at a temperature below 0° C., whereby said cells are preserved for future use and their therapeutic efficacy is enhanced.

References Cited in the file of this patent

UNITED STATES PATENTS

| | | |
|---|---|---|
| 1,895,977 | Dressel | Jan. 31, 1933 |
| 2,085,391 | Reichel | June 29, 1937 |

FOREIGN PATENTS

| | | |
|---|---|---|
| 679,738 | Great Britain | Sept. 24, 1952 |